United States Patent
Watson et al.

(10) Patent No.: US 8,296,894 B2
(45) Date of Patent: Oct. 30, 2012

(54) APPARATUS FOR AUTOMATED LAUNCHING OF MULTIPLE PIPELINE PIGS

(75) Inventors: William Stanley Watson, Darlington (GB); David Colin Bacon, Northallerton (GB)

(73) Assignee: Pipeline Engineering & Supply Company, Limited (GB)

( * ) Notice: Subject to any disclaimer, the term of this patent is extended or adjusted under 35 U.S.C. 154(b) by 953 days.

(21) Appl. No.: 12/280,289

(22) PCT Filed: Feb. 21, 2007

(86) PCT No.: PCT/GB2007/000597
§ 371 (c)(1),
(2), (4) Date: Nov. 24, 2008

(87) PCT Pub. No.: WO2007/096608
PCT Pub. Date: Aug. 30, 2007

(65) Prior Publication Data
US 2009/0083922 A1 Apr. 2, 2009

(30) Foreign Application Priority Data
Feb. 21, 2006 (GB) .................................. 0603369.0

(51) Int. Cl.
*F16L 53/38* (2006.01)
(52) U.S. Cl. .......... 15/104.062; 15/104.061; 15/104.063
(58) Field of Classification Search ............. 15/104.061, 15/104.062, 104.063
See application file for complete search history.

(56) References Cited

U.S. PATENT DOCUMENTS

| 6,098,231 | A * | 8/2000 | Smith et al. ............... 15/104.061 |
| 6,944,902 | B1 | 9/2005 | Richter et al. |
| 2004/0099406 | A1 * | 5/2004 | Schildmann et al. ........... 165/95 |
| 2006/0064829 | A1 * | 3/2006 | Houldey et al. .......... 15/104.061 |

FOREIGN PATENT DOCUMENTS

| GB | 2326 209 A | 12/1998 |
| WO | WO 97/17566 | 5/1997 |

OTHER PUBLICATIONS

PCT/GB2007/000597 International Preliminary Report on Patentability, May 23, 2008.
PCT/GB2007/000597 International Search Report, Jul. 17, 2007.

* cited by examiner

*Primary Examiner* — Robert Scruggs
(74) *Attorney, Agent, or Firm* — Benesch, Friedlander, Coplan & Aronoff LLP

(57) ABSTRACT

A pipeline pig and pig launching apparatus which allow the automatic launching of multiple pigs into a pipeline are claimed. The pipeline pig comprises an elongate body having first and second ends and a fluid passage defined therein. The fluid passage has an inlet at the first end of the body and an outlet at the second end of the body. At least two support members project radially outwardly from the body and are spaced longitudinally from one another along the body. A valve means is located within the passage and adapted to selectively move between a first position in which fluid is free to flow through the outlet and a second position in which fluid cannot flow through the outlet. A projecting member extends longitudinally from the first end of the body.

24 Claims, 4 Drawing Sheets

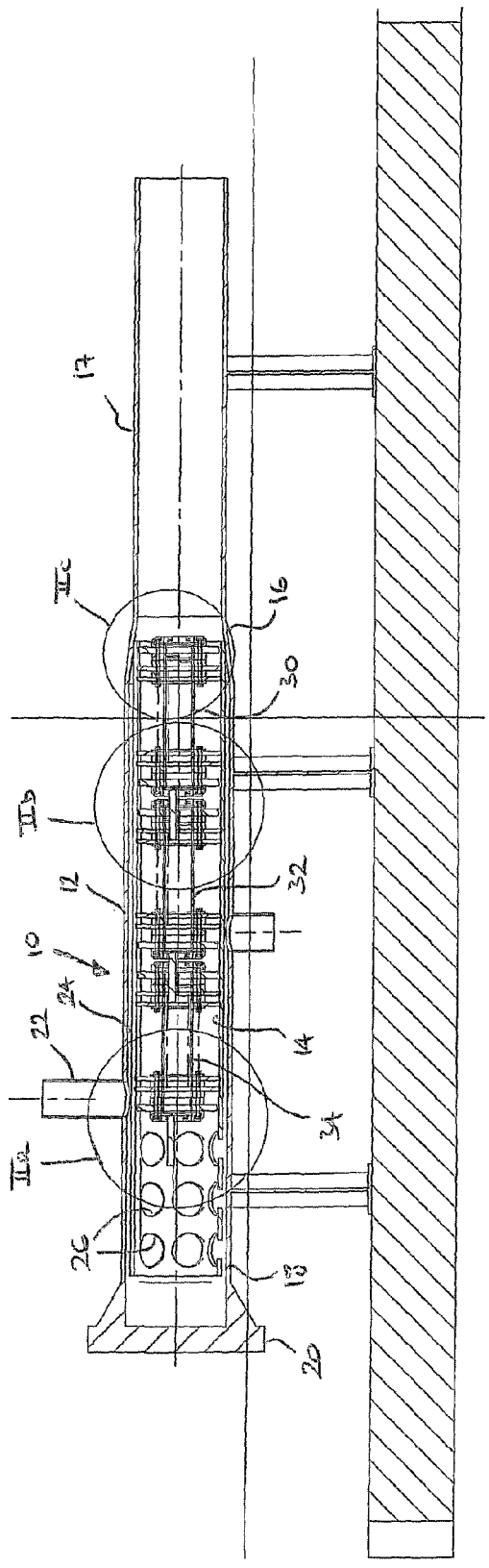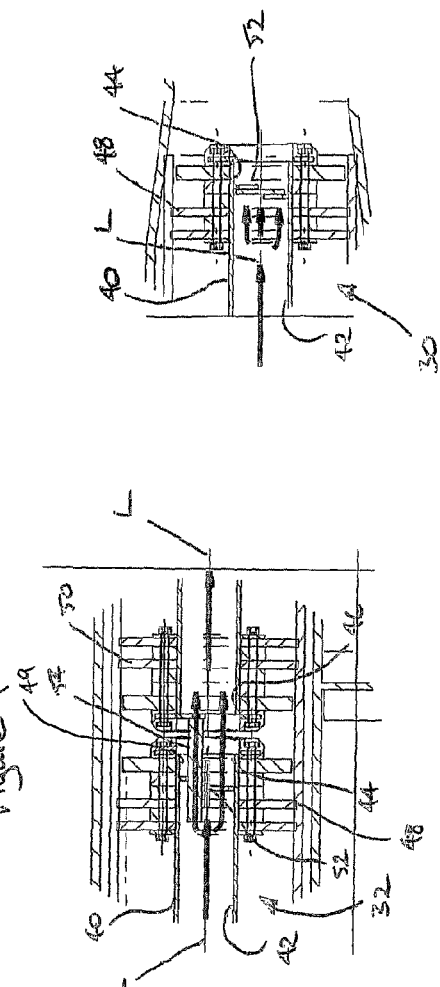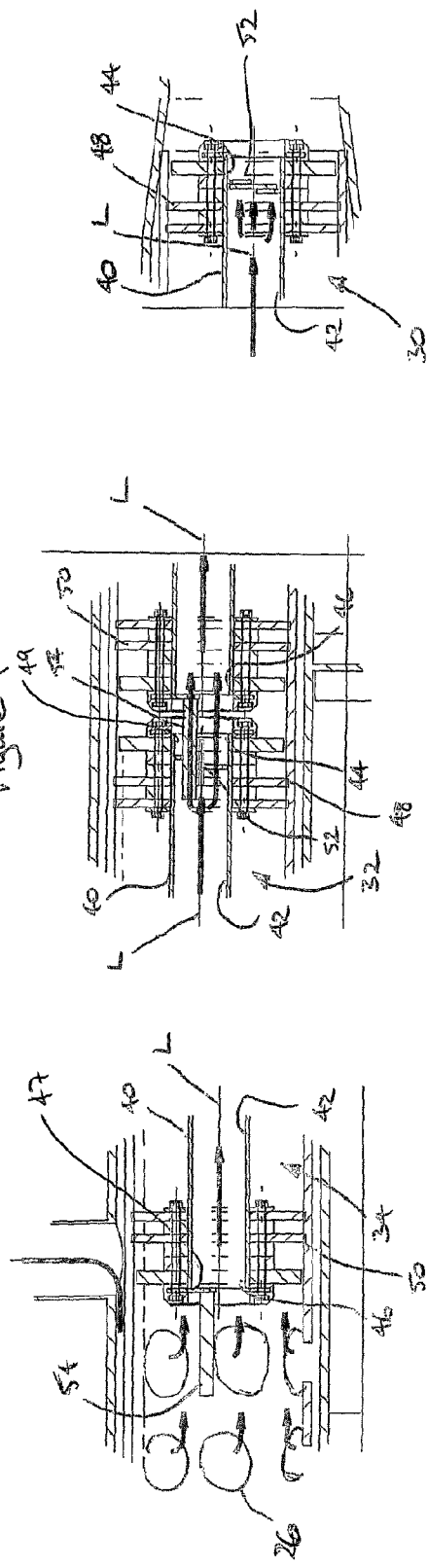

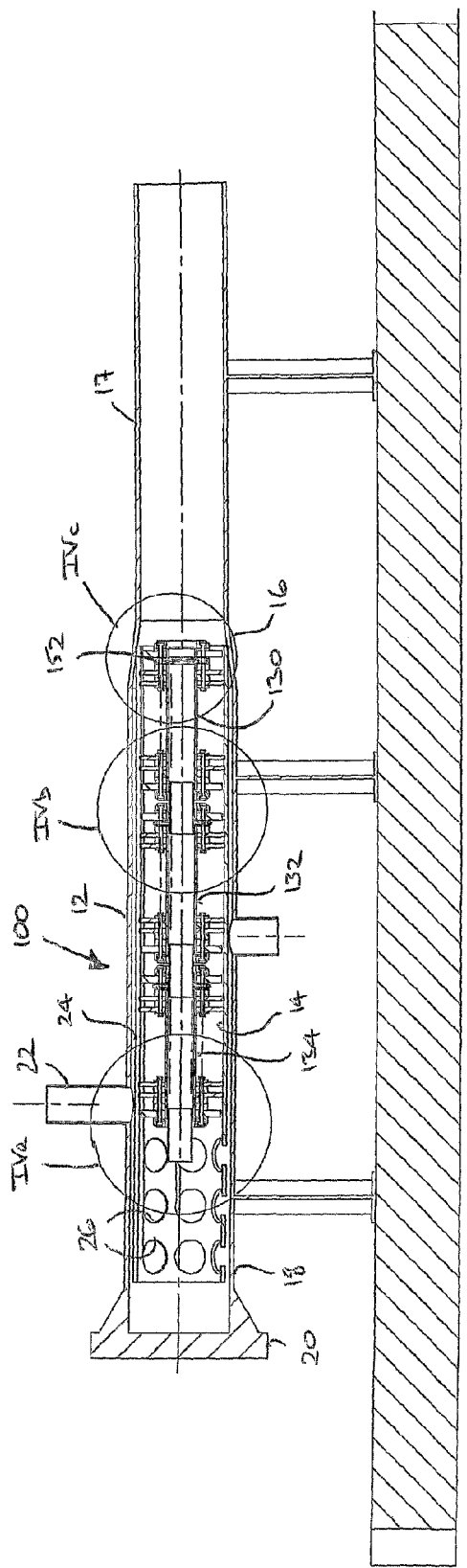

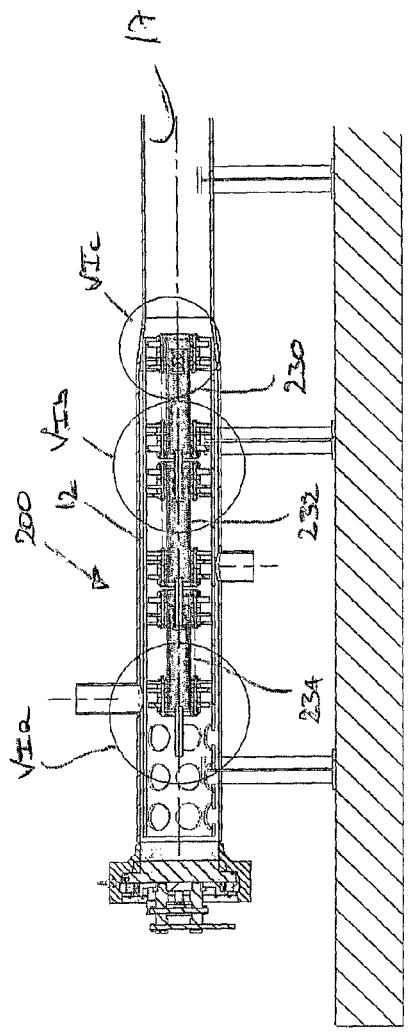
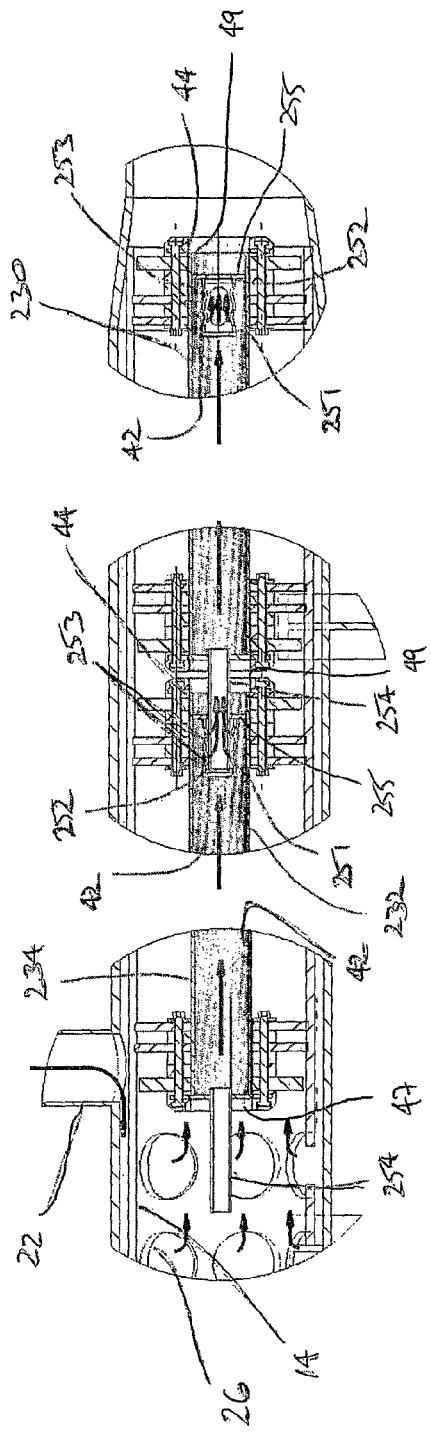

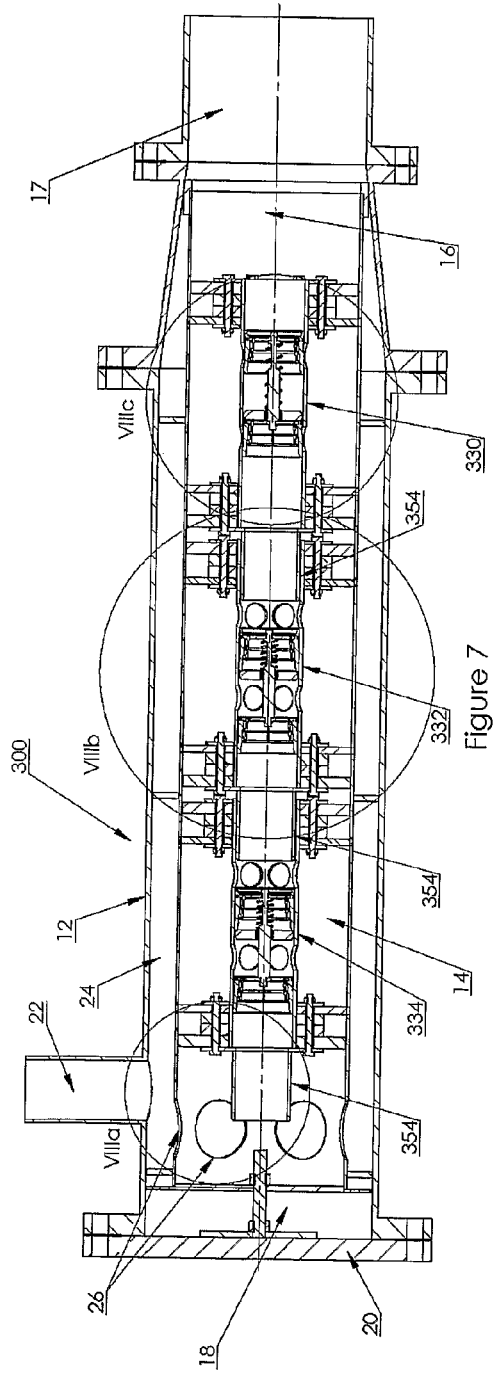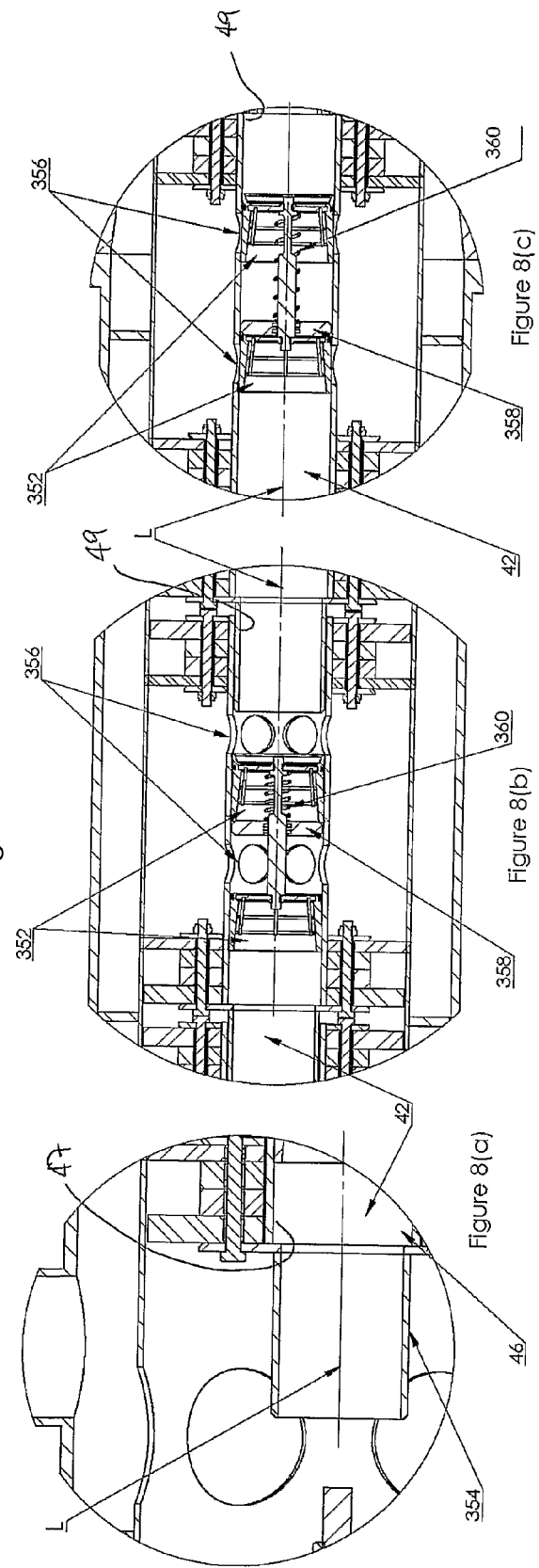

APPARATUS FOR AUTOMATED LAUNCHING OF MULTIPLE PIPELINE PIGS

The present invention relates to the field of pipeline pigs. More specifically, the present invention relates to a pipeline pig and pig launching apparatus which allow the automatic launching of multiple pigs into a pipeline.

In normal circumstances, if a pipeline pig is to clean or survey a pipeline, it is placed in a pig trap and then launched into the pipeline. The trap is normally a branch off the main pipeline which will have a valve arrangement for selectively allowing pressurised fluid to enter the branch and force the pig into the pipeline.

The pigs are loaded into a pipeline individually and then launched. This presents a disadvantage in terms of time and operating costs, as each pig requires operator input to both place the pig in the trap and to operate the valve arrangement in order to launch the pig. A solution to this disadvantage has been proposed in which the trap is adapted to hold more than one pig at a time. In the proposed solution, two or more pigs are loaded in-line into a trap which is longer than a conventional single pig trap. The fluid inlet arrangement is adapted so that a respective fluid inlet pipe enters the trap behind each of the pigs. Each fluid inlet pipe has a valve or valves which control fluid flow into the trap. By correctly manipulating the valves so that only one fluid inlet is open at a time, pressurised fluid can be fed into the trap behind the pig which is to be launched, thereby launching the first pig in line into the pipeline, but ensuring that the remaining pigs stay in the trap.

A disadvantage of this solution is that it requires relatively complex pipework and valve arrangements to be fitted outside the trap so that the pigs are launched in sequence. The pipework and valves significantly increase the cost of manufacture of the trap, and also increase the complexity of the trap's operation.

It is an aim of the present invention to obviate or mitigate one or more of the aforementioned disadvantages.

According to a first aspect of the present invention, there is provided a pipeline pig comprising:
an elongate body having first and second ends and a fluid passage defined therein, the fluid passage having an inlet at the first end of the body and an outlet at the second end of the body;
at least two support members projecting radially outwardly from the body and spaced longitudinally from one another along the body;
a valve means located within the passage and adapted to selectively move between a first position in which fluid is free to flow through the outlet and a second position in which fluid cannot flow through the outlet; and
a projecting member extending longitudinally from the first end of the body.

Preferably, the body further comprises:
first and second apertures spaced longitudinally from one another along the fluid passage, the apertures allowing fluid communication between the passage and the exterior of the body; and
a plate member located in the fluid passage between the first and second apertures, the plate member preventing fluid flow through the portion of the passage lying between the first and second apertures;
wherein the valve means is adapted to selectively move between a first position in which the first and second apertures are open and fluid flow can bypass the plate member, and a second position in which the first and second apertures are closed and fluid cannot bypass the plate member.

Preferably, the valve means comprises a seal adapted to slide axially within the passage, the seal comprising first and second sealing members which are adapted to selectively block the first and second apertures, respectively, when the seal is in the second position. Preferably, the seal further comprises a biasing means adapted to bias the seal into the second position.

Preferably, the body comprises a plurality of first and second apertures, each plurality of apertures being located either side of the plate member and positioned about the circumference of the body.

Preferably, the pig further comprises:
a position sensor located in the passage adjacent the outlet;
a control means adapted to receive signals from the position sensor; and
an actuator adapted to move the valve means in response to signals from the control means.

Preferably, the sensor is spaced a first longitudinal distance from the second end of the body, and the length of the projecting member is greater than the first longitudinal distance.

Preferably, the valve means further comprises a holding means for selectively holding the valve means in the first position.

Preferably, the control means is adapted to receive signals from a pig launching apparatus and to send control signals to the holding means in response to the signals received.

In an alternative embodiment the valve means comprises a flap valve, the flap valve comprising a hinged flap adapted to move between the first position and the second position. Preferably, the flap is biased towards the second position.

In a further alternative embodiment the valve means comprises a diaphragm shutter, the shutter comprising a plurality of shutter blades which collectively move between the first position and the second position. Preferably, each shutter blade is biased towards the second position.

In a still further alternative embodiment the valve means comprises:
a hollow valve body located in the passage, the valve body having an open end adjacent the outlet and at least one valve aperture permitting fluid communication between the interior and exterior of the valve body;
a mounting plate fixing the valve body to the body of the pig, the mounting plate preventing fluid flow past the valve means; and
a sealing disc adapted to move axially within the valve body between a first position in which fluid may flow through the valve aperture and the open end of the valve body, and a second position in which fluid cannot flow through the valve aperture and the open end of the valve body.

Preferably, the sealing disc is biased towards the second position.

Preferably, the valve means further comprises a holding means for selectively holding the valve means in the first position.

Preferably, the pig further comprises a control means adapted to receive signals from a pig launching apparatus and to send control signals to the holding means in response to the signals received.

Preferably, the valve means is spaced a first longitudinal distance from the first end of the body, and the length of the projecting member is greater than the first longitudinal distance.

Preferably, the projecting member is hollow and in fluid communication with the fluid passage inlet. Preferably, the projecting member projects substantially parallel to the longitudinal axis of the body.

According to a second aspect of the present invention, there is provided an apparatus for launching multiple pipeline pigs, the apparatus comprising:

an elongate pipeline pig trap having an open first end adapted to be fitted to a pipeline and a fluid inlet in communication with the trap; and at least two pipeline pigs in accordance with the first aspect of the invention;

wherein the two pipeline pigs are located in-line with one another in the trap, the projecting member of the first pig extending into the passage of the second pig such that the valve means of the second pig is held in the first position.

Preferably, the apparatus further comprises a fluid inlet valve adapted to selectively open and close the fluid inlet.

Preferably, the valve means of each pig further comprises a holding means for selectively holding the valve means in the first position.

Preferably, the apparatus further comprises a valve control means adapted to control the fluid inlet valve, and each pig further comprises a control means adapted to receive signals from the valve control means and send control signals to the holding means in response to the signals received.

Preferred embodiments of the invention will now be described, by way of example only, with reference to the accompanying drawings, in which:

FIG. 1 is a vertical section through a first embodiment of a pig trap in accordance with the present invention;

FIGS. 2(a)-(c) are detail views of the areas marked IIa, IIb and IIc in FIG. 1;

FIG. 3 is a vertical section through a second embodiment of a pig trap in accordance with the present invention;

FIGS. 4(a)-(c) are detail views of the areas marked IVa, IVb and IVc in FIG. 3;

FIG. 5 is a vertical section through a third embodiment of a pig trap in accordance with the present invention;

FIGS. 6(a)-(c) are detail views of the areas marked VIa, VIb and VIc in FIG. 5;

FIG. 7 is a vertical section through a fourth embodiment of a pig trap in accordance with the present invention; and FIGS. 8(a)-(c) are detail views of the areas marked VIIIa, VIIIb and VIIIc in FIG. 7.

An apparatus for launching multiple pipeline pigs is shown in vertical section in FIG. 1. The apparatus, generally designated 10, comprises an elongate pipeline pig trap 12 which is hollow so as to define an internal passage 14. A first end 16 of the trap 12 is open and is adapted to be connected to a suitable branch or end of a pipeline 17. The passage 14 is of generally the same diameter as the pipeline 17 into which the pigs will be launched. A second end 18 of the trap 12 is closed off by a reinforced blanking plate 20, which may be removed in order to load pigs into the passage 14.

A pressurised fluid inlet 22 is provided on the trap 12 adjacent the second end 18 thereof. The fluid inlet 22 supplies pressurised fluid into the passage 14 when a fluid inlet valve (not shown) is opened upstream of the inlet 22. In the illustrated embodiment, a fluid jacket 24 is defined between the passage 14 and the trap 12. The portion of the passage 14 adjacent the second end 18 of the trap 12 is provided with a number of apertures 26 which allow the pressurised fluid to pass from the inlet 22 via the jacket 24 into the passage 14.

The apparatus 10 further comprises at least two pipeline pigs located in-line in the trap 12. In the illustrated embodiment, there are three pigs 30,32,34 located in-line in the passage 12. Each of the three pigs 30,32,34 illustrated are identical, although they may include additional tools if they are to perform different functions. As best seen in the detail views of FIGS. 2(a)-(c), each pig 30,32,34 comprises an elongate body 40 which is hollow so as to define a passage 42. Each body 40 shares a longitudinal axis L and has a first, or upstream, end 46 and a second, or downstream end 44. The passage 42 extends between the first and second ends 46,44. The passage 42 has an inlet 47 and an outlet 49 located at the first and second ends 46, 44 of the body 40, respectively.

Each pig 30,32,34 further comprises at least two support members, shown here in the form of annular discs 48,50, projecting radially outwardly from the body 40 and spaced longitudinally from one another along the body 40. Preferably, the at least two discs 48,50 are located adjacent the first and second ends 46,44 of the body 40, respectively. The discs may be conventional discs of a resilient plastics or rubber material. The support members keep the pig centred in the pipeline and also provide a scraping and flushing action as the pig moves through the pipe. In the illustrated embodiment, it can be seen that more than one disc is present at either end of each body 40. It will be appreciated that the number of support members and other tools on the body can be varied according to the function which is to be performed by the particular pig once inside the pipeline 17.

Within the passage 42 of each pig 30,32,34 is located a valve means, which in the embodiment of FIGS. 1 and 2 is in the form of a flap valve 52. This can be best seen in FIGS. 2(b) and 2(c). The flap valve 52 includes a hinged flap which is adapted to selectively move between a first position in which the outlet 49 is open, as in FIG. 2(b), and a second position in which the outlet 49 is closed, as in FIG. 2(c). Each pig 30,32,34 also includes a projecting member 54 which projects from the first end 46 of each pig 30,32,34. Preferably, the projecting member 54 projects generally parallel to the longitudinal axis L. This can be seen best in FIGS. 2(a) and 2(b). The flap valve 52 is spaced a first longitudinal distance from the second end 44 of the body, and the length of each projecting member 54 is greater than that first longitudinal distance. In other words, the length of each projecting member 54 is such that when the pigs 30,32,34 are arranged in-line in the trap 12, the projecting member 54 of the preceding pig projects into the passage 42 of the following pig and holds open the hinged flap of the flap valve 52 in the following pig. Each projecting member 54 is preferably hollow and in fluid communication with the inlet 47 to the passage 42.

The flap valve 52 is preferably provided with a biasing means (not shown) which biases the hinged flap towards the second, or closed, position. The biasing means may be a spring or the like. In addition, the flap valve 52 preferably further comprises a holding means (not shown) for selectively holding the flap in the first, or open, position. The holding means may be a form of magnet, such as an electromagnet, or else it may be a lock, such as an electromechanical lock. With either example, the holding means can be activated and de-activated remotely via a control means adapted to receive signals from the pig launching apparatus and to send control signals to the holding means in response to the signals received.

FIGS. 3 and 4 illustrate a second embodiment of the apparatus, which here is generally designated 100. The majority of the components described above in relation to the first embodiment are shared with the second embodiment and will therefore not be described further here. Like components are assigned the same reference signs in FIGS. 3 and 4 as in FIGS. 1 and 2.

Where the second embodiment of the apparatus differs from the first embodiment is in the valve means of the pigs 130,132,134. The valve means located in the passage of each pig 130,132,134 is in the form of a diaphragm shutter 152. Similar to a camera shutter, the diaphragm shutter 152 is made up of a plurality of shutter blades, which are each adapted to co-operate with one another so as to move between first positions in which the outlet 49 is open to second positions in which the outlet 49 is closed by the shutter 152. This can be best seen in FIGS. 4(b) and 4(c). The shutter 152 can be seen in the first, or open, position in FIG. 4(b), and in the second, or closed position, in FIG. 4(c). A projecting member 154 projects longitudinally from the first end 46 of each pig 130,132,134. The shutter 152 is spaced a longitudinal distance from the second end 44 of the body, and the length of each projecting member 154 is greater than that first longitudinal distance. In other words, the length of each projecting member 154 is such that when the pigs 130,132,134 are arranged in-line in the trap 12, the projecting member 154 of the preceding pig projects into the passage 42 of the following pig and pushes open the shutter 152 in the following pig and holds it open. In the second embodiment, the diameter of the projecting member 154 is greater so as to ensure that each shutter blade in the following pig is pushed open by the projecting member 154 of the preceding pig. The projecting members 154 are preferably hollow and in fluid communication with the inlet 47 to the passage 42.

The shutter 152 is preferably provided with a biasing means (not shown) which biases each of the shutter blades towards the second, or closed, position. The biasing means may be a spring or the like. In addition, the shutter 152 preferably further comprises a holding means (not shown) for selectively holding the shutter blades in the first position. The holding means may be a form of magnet, such as an electromagnet, or else it may be a lock, such as an electromechanical lock. With either example, the holding means can be activated and de-activated remotely via a control means adapted to receive signals from the pig launching apparatus and to send control signals to the holding means in response to the signals received.

FIGS. 5 and 6 illustrate a third embodiment of the apparatus, which here is generally designated 200. The majority of the components described above in relation to the first and second embodiments are shared with the third embodiment and will therefore not be described further here. Like components are assigned the same reference signs in FIGS. 5 and 6 as in the preceding figures.

Where the third embodiment of the apparatus differs from the first and second embodiments is again in the valve means of the pigs 230,232,234. The valve means located in the passage of each pig 230,232,234 comprises a cylindrical valve body 251 which is co-axial with the passage 42. The valve body 251 is connected to the wall of the passage 42 by an annular mounting plate 255. The mounting plate 255 ensures that fluid may only pass through the passage 42 by way of a number of apertures 253 along the length of the valve body 251, which allow fluid communication between the exterior and interior of the valve body 251. A sealing disc 252 is located co-axially within the valve body 251 and in sealing engagement with the internal walls of the valve body 251 so as to form a seal. The sealing disc 252 can slide axially along the interior of the valve body 251 in the manner of a piston between a first position in which the outlet 49 is open and a second position in which the outlet 49 is closed. FIG. 6(b) shows the valve means is in the open position where, the sealing disc 252 is at the upstream end of the valve body 251, and fluid can flow through the apertures 253 and out of the downstream end of the valve body 251 into a projecting member 254 of the preceding pig 230. FIG. 6(c) shows the valve means in the closed position, where the sealing disc 252 is at the downstream end of the valve body 251 and fluid cannot pass through the apertures 253 into the downstream end of the pig.

Each valve means preferably has a biasing means (not shown) which biases the sealing disc 252 towards the second, or closed, position. In this way, fluid entering the interior of the valve body 251 via the apertures 253 cannot pass through the valve means and out of the outlet 49. In addition, the sealing valve means preferably further comprises a holding means (not shown) for selectively holding the sealing disc 252 in the first position. The holding means may be a form of magnet, such as an electromagnet, or else it may be a lock, such as an electromechanical lock. With either example, the holding means can be activated and de-activated remotely via a control means of the type used in the first and second embodiments of the invention described above.

The projecting members 254 project longitudinally from the first end 46 of each pig 230,232,234. The valve means is spaced a longitudinal distance from the second end 44 of the body, and the length of each projecting member 254 is greater than that first longitudinal distance. In other words, the length of each projecting member 254 is such that when the pigs 230,232,234 are arranged in-line in the trap 12, the projecting member 254 of the preceding pig projects into the passage 42 and valve body 251 of the following pig and pushes the sealing disc 252 away from its closed position to the open position shown in FIG. 6(b). As a result, the sealing disc 252 is now upstream of the apertures 253, thereby allowing fluid to pass through the apertures 253 and out through the outlet 49. The projecting members 254 are preferably hollow to permit fluid flow therethrough and in fluid communication with the inlet 47.

FIGS. 7 and 8 illustrate a fourth embodiment of the apparatus, which is generally designated 300. The majority of the components described above in relation to the first, second and third embodiments are shared with the fourth embodiment and will therefore not be described further here. Like components have been assigned the same reference signs in FIGS. 7 and 8 as in the preceding figures.

In the preceding embodiments, it has been the valve means which has provided the hydraulic surface against which the pressurised fluid acts when the valve is closed. In the fourth embodiment of the apparatus, that hydraulic surface is provided by a pigging plate 358 fixed in a sealing engagement in the passage 42 of the pigs 330, 332, 334. The pigging plate 358 therefore prevents the flow of hydraulic fluid straight through the passage 42 from the inlet 47 to the outlet 49. In order to allow flow of fluid around the pigging plate 358, each pig body 40 has two sets of bypass apertures 356 allowing fluid communication between the passage 42 and the exterior of the pig body 40. One set of apertures 356 is located upstream of the pigging plate 358 while the second set of apertures 356 is located downstream of the pigging plate 358.

The valve means of the fourth embodiment is provided in the form of a sliding seal comprising a pair of sealing members 352. The sealing members 352 of each sliding seal are fixed to one another and slide axially within the passage 42 of a respective pig 330, 332, 334. The sealing members 352 are substantially cylindrical and rest on the inner circumference of the passage 42. The sealing members 352 permit fluid to flow through them. However, the sealing members 352 can slide between a first position, in which the bypass holes 356 are open and hence fluid can flow through the sealing members and through the bypass holes 356, to a second position in which the bypass holes 356 are closed and fluid cannot bypass the pigging plate 358. These first and second positions can be seen best in FIGS. 8(b) and 8(c), respectively.

The sliding seal has a biasing means that biases the sealing members 352 towards the second, or closed, positions. Preferably, the biasing means is a compression spring 360 positioned between the downstream sealing member (the right hand sealing member of each pair when viewed in the figures) and the pigging plate 358. The sealing members 352 of each seal are held in the first or open position against the force of the biasing means by a mechanical locking means (not shown) prior to loading into the trap 12.

A projecting member 354 projects longitudinally from the first end 46 of each pig 330, 332, 334. The projecting members 354 are preferably hollow. When the pigs 330, 332, 334 are arranged in-line in the trap 12, the projecting member 354 of the preceding pig projects into the passage 42 of the subsequent pig in the manner of the previously described embodiments. Each passage 42 includes a sensor which detects when a projecting member 354 is located in the passage. The sensor sends signals to a control means (not shown) that prevents the mechanical lock from releasing the sliding seal into its closed position whilst the projecting member 354 remains in the passage. An actuator (not shown) moves the sliding seal in response to signals from the control means.

The method of operation of the first, second and third embodiments of the apparatus will now be described. Once the pigs have been loaded into the trap 12, they are arranged such that the projecting members of the preceding pigs hold open the valve means of the following pig. Therefore, in the embodiment of FIG. 1, the projecting member 54 of the first pig 30 holds open the valve means of the second pig 32, and the projecting member 54 of the second pig 32 holds open the valve means of the third pig 34. The same arrangement of the pigs is provided in the second and third embodiments shown in FIGS. 3 and 5, respectively.

As shown in FIGS. 2(a), 4(a) and 6(a), when the inlet valve is opened and pressurised fluid flows into the trap 12 via the fluid inlet 22, the fluid passes through the apertures 26 into the passage 14. With conventional pigs having bodies with closed ends, the fluid would then act upon the hydraulic surface provided by the discs 48,50 and the pigs would be forced out of the trap 12 into the pipeline 17. However, because the pigs of the present invention are hollow, the pressurised fluid may pass through them, so long as the valve means therein remain in the open position. Thus, in FIGS. 2(a), 4(a) and 6(a), the fluid can be seen passing from the passage 14 of the trap 12 into the passage 42 defined in the pigs 34,134,234. As the projecting members 54,154,254 of the second pigs 32,132,232 are keeping the valve means of the third pigs 34,134,234 open, the fluid is free to flow through the passage 42 of the third pig 34,134,234 thereby bypassing the discs 48,50. Similarly, FIGS. 2(b), 4(b) and 6(b) show that the projecting members 54,154,254 of the first pigs 30,130,230 are also holding open the valve means of the second pigs 32,132,232 so the fluid flow continues through the passages 42 of the second pigs 32,132,232 again bypassing the discs 48,50 of the second pigs.

As the first pig 30,130,230 has no pig in front of it in the trap 12, it has no projecting member holding open its valve means. Thus, the respective flap valve 52, shutter 152 or sealing disc 252 is in the closed position, thereby blocking the outlet 49 of the first pigs 30,130,230, respectively. The closed valve means prevents fluid flowing through the first pig 30,130,230 and creates a hydraulic surface within the passage 42. The fluid acts upon the closed valve means and also backs up to act upon the discs 48,50 of the first pig. The build up in pressure by the pressurised fluid thus forces the first pig 30,130,230 out of the trap 12 into the pipeline 17.

Once the first pig 30,130,230 has left the trap 12, its projecting member 54,154,254 is no longer holding open the valve means of the second pig 32,132,232. As explained above, the valve means of the three embodiments can optionally be biased by a biasing means towards the closed position. However, if the biasing means closes the valve means too quickly, there is a risk that the second pig 32,132,232 will also be launched from the trap by the pressurised fluid acting upon the closed valve means in the second pig 32,132,232. Therefore, if the valve means are provided with biasing means, it is preferable that the holding and control means described above should also be included for each valve means. The holding means ensures that once the projecting members 54,154,254 of a preceding pig open the valve means of the following pig, then the valve means stays open until the holding means is deactivated. This ensures that there is time for the trap 12 to depressurise following the launch of the first pig 30,130,230 before the valve means of the second pig 32,132,232 is closed. In this way, if the fluid inlet valve is not closed immediately after the launch of the preceding pig, inadvertent launch of the following pigs is avoided.

The launch of the second pigs 32,132,232 is achieved in the same manner. The pressurised fluid passes through the third pig and acts upon the closed valve means of the second pig 32,132,232. Pressure build up forces the second pigs 32,132,232 from the trap into the pipeline 17. The departure of the second pigs 32,132,232 removes the projecting means 54,154,254 of the second pigs 32,132,232 from the valve means of the third pigs 34,134,234, thereby allowing the valve means of the third pigs 34,134,234 to close when the trap has depressurised. Without a pig in front of them, the valve means of the third pigs 34,134,234 is closed and will be acted upon by the pressurised fluid the next time fluid is introduced into the trap 12. The third pigs 34,134,234 are thus launched by the pressurised fluid acting upon the closed valve means therein. Once all the pigs have been launched, more can be loaded via the second end 18 of the trap 12.

The method of operation of the fourth embodiment of the apparatus is similar to that of the preceding embodiments. Once the pigs have been loaded into the trap 12, they are arranged such that the projecting members 354 of the preceding pigs are located in the passages 42 of the subsequent pigs. As a result, the sensors in the passages of the subsequent pigs indicate to the control means that the locking means should continue to hold the sliding seals in the first or open position.

When the inlet valve of the system is opened, pressurised fluid flows into the passage 14 of the fourth embodiment in the same manner as with the preceding embodiments. Referring to FIGS. 7 and 8(a)-(c), the pressurised fluid may bypass the pigging plates 358 of the second and third pigs 332, 334 as the bypass apertures 356 are open in these pigs due to their respective sliding seals being in the open position. Thus, the valves of these pigs remain in the open position and the fluid is free to flow through the passage 42 past the pigging plates 358 and discs 48,50 and out of the outlet 49.

As the first pig 330 has no pig in front of it in the trap 12, it has no projecting member in its passage 42. As a result, the control system releases the locking means, thereby allowing the sliding seal to move into the closed position under the action of the biasing means. As best seen in FIG. 8(c), with the seal closed the seal members 352 block the bypass apertures 356. Thus, the pressurised fluid entering the passage 42 of the first pig 330 cannot bypass the pigging plate 358 and the outlet 49 is this closed. Instead, the hydraulic forces build on the pigging plate 358 until the first pig 330 is forced from the trap 12 into the pipeline 17.

Once the first pig 330 has left the trap 12, its projecting member 354 is no longer in the passage 42 of the second pig 332. As a result, the control means will instruct the locking means to release the sliding seal of the second pig 332 into the closed position. The control means ensures that the closing of the sliding seal is not instantaneous after the first pig has been launched. A valve control means (not shown) signals to the control means of the pigs the state of the fluid inlet valve of the launch apparatus. This ensures that there is time for the trap 12 to depressurise following the launch of the first pig 330 before the valve means of the second pig 332 is closed. As with the preceding embodiments, this ensures that if the fluid inlet valve is not closed immediately after the launch of the preceding pig, inadvertent launch of the following pigs is avoided.

The launch of the second pig 332 is achieved in the same manner as the first pig. Once the second pig has launched, the locking means of the third pig will release its sliding seal into the closed position and the third pig can then be launched. Once all the pigs have been launched, more can be loaded via the second end 18 of the trap 12.

An advantage of the present invention is that it permits the automatic and sequential launching of multiple pipeline pigs from a pig trap. Multiple pigs can be loaded into the trap at one time, saving on labour and operating costs. Furthermore, this sequential launching is achieved without the need for expensive modifications to the pressurised fluid pipework connected to the trap. Instead, the present invention may be used with an existing single fluid inlet. With the provision of selectively operable valve means within the body of each pig, pigs can be launched in such a way as the following pig is not also launched immediately if the fluid inlet valve fails to close the instant after the launch of the preceding pig. This ensures that costly accidental multiple launches of the pigs do not occur.

Although the illustrated embodiment has the jacket 24 defined between the trap 12 and passage 14, it should be understood that this arrangement is not essential. In an alternative embodiment, the fluid inlet communicates directly with the passage without any need for a jacket between the trap and passage.

A one-way valve may be provided in the trap adjacent the first end thereof. The one-way valve will ensure depressurisation of the trap and prevent any reverse movement of the pigs in the trap due to fluid flow reversal.

Other modifications and improvements may be incorporated without departing from the scope of the present invention.

What is claimed is:

1. A first pipeline pig comprising:
   an elongate body having first and second ends and a fluid passage defined therein, the fluid passage having an inlet at the first end of the body and an outlet at the second end of the body;
   at least two support members projecting radially outwardly from the body and spaced longitudinally from one another along the body;
   a projecting member extending longitudinally from the first end of the body; and
   a valve means located within the passage and adapted to selectively move between a first position in which fluid is free to flow through the outlet and a second position in which fluid cannot flow through the outlet; and
   wherein the valve means is adapted to be held in the first position by a projecting member of an identical second pig when the first and second pigs are arranged in-line.

2. The pipeline pig of claim 1, wherein the body further comprises:
   first and second apertures spaced longitudinally from one another along the fluid passage, the apertures allowing fluid communication between the passage and the exterior of the body; and
   a plate member located in the fluid passage between the first and second apertures, the plate member preventing fluid flow through the portion of the passage lying between the first and second apertures;
   wherein the valve means is adapted to selectively move between a first position in which the first and second apertures are open and fluid flow can bypass the plate member, and a second position in which the first and second apertures are closed and fluid cannot bypass the plate member.

3. The pipeline pig of claim 2, wherein the valve means comprises a seal adapted to slide axially within the passage, the seal comprising first and second sealing members which are adapted to selectively block the first and second apertures, respectively, when the seal is in the second position.

4. The pipeline pig of claim 3, wherein the seal further comprises a biasing means adapted to bias the seal into the second position.

5. The pipeline pig of claim 2, wherein the body comprises a plurality of first and second apertures, each plurality of apertures being located either side of the plate member and positioned about the circumference of the body.

6. The pipeline pig of claim 2 further comprising:
   a position sensor located in the passage adjacent the outlet;
   a control means adapted to receive signals from the position sensor; and
   an actuator adapted to move the valve means in response to signals from the control means.

7. The pipeline pig of claim 6, wherein the sensor is spaced a first longitudinal distance from the second end of the body, and the length of the projecting member is greater than the first longitudinal distance.

8. The pipeline pig of claim 6, wherein the valve means further comprises a holding means for selectively holding the valve means in the first position.

9. The pipeline pig of claim 8, wherein the control means is adapted to receive signals from a pig launching apparatus and to send control signals to the holding means in response to the signals received.

10. The pipeline pig of claim 1, wherein the valve means comprises a flap valve, the flap valve comprising a hinged flap adapted to move between the first position and the second position.

11. The pipeline pig of claim 10, wherein the flap is biased towards the second position.

12. The pipeline pig of claim 1, wherein the valve means comprises a diaphragm shutter, the shutter comprising a plurality of shutter blades which collectively move between the first position and the second position.

13. The pipeline pig of claim 12, wherein each shutter blade is biased towards the second position.

14. The pipeline pig of claim 1, wherein the valve means comprises:
   a hollow valve body located in the passage, the valve body having an open end adjacent the outlet and at least one valve aperture permitting fluid communication between the interior and exterior of the valve body;
   a mounting plate fixing the valve body to the body of the pig, the mounting plate preventing fluid flow past the valve means; and a sealing disc adapted to move axially within the valve body between a first position in which fluid may flow through the valve aperture and the open end of the valve body, and a second position in which fluid cannot flow through the valve aperture and the open end of the valve body.

15. The pipeline pig of claim 14, wherein the sealing disc is biased towards the second position.

16. The pipeline pig of claim 10, wherein the valve means further comprises a holding means for selectively holding the valve means in the first position.

17. The pipeline pig of claim 16 further comprising a control means adapted to receive signals from a pig launching apparatus and to send control signals to the holding means in response to the signals received.

18. The pipeline pig of claim 10, wherein the valve means is spaced a first longitudinal distance from the first end of the body, and the length of the projecting member is greater than the first longitudinal distance.

19. The pipeline pig of claim 1, wherein the projecting member is hollow and in fluid communication with the fluid passage inlet.

20. The pipeline pig of claim 1, wherein the projecting member projects substantially parallel to the longitudinal axis of the body.

21. An apparatus for launching multiple pipeline pigs, the apparatus comprising:
an elongate pipeline pig trap having an open first end adapted to be fitted to a pipeline and a fluid inlet in communication with the trap; and
at least two pipeline pigs in accordance with claim 1;
wherein the two pipeline pigs are located in-line with one another in the trap, the projecting member of the first pig extending into the passage of the second pig such that the valve means of the second pig is held in the first position.

22. The apparatus of claim 21 further comprising a fluid inlet valve adapted to selectively open and close the fluid inlet.

23. The apparatus of claim 21, wherein the valve means of each pig further comprises a holding means for selectively holding the valve means in the first position.

24. The apparatus of claim 23 further comprising a valve control means adapted to control the fluid inlet valve, and each pig further comprises a control means adapted to receive signals from the valve control means and send control signals to the holding means in response to the signals received.

* * * * *